(12) United States Patent
Gormley

(10) Patent No.: US 10,794,328 B2
(45) Date of Patent: Oct. 6, 2020

(54) THRUST REVERSER WITH BLOCKER DOOR FOLDING LINKAGE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 272 days.

(21) Appl. No.: 16/029,174

(22) Filed: Jul. 6, 2018

(65) Prior Publication Data

US 2020/0011272 A1    Jan. 9, 2020

(51) Int. Cl.
| | |
|---|---|
| *F02K 1/76* | (2006.01) |
| *F02K 1/62* | (2006.01) |
| *F16H 21/44* | (2006.01) |

(52) U.S. Cl.
CPC ............. *F02K 1/763* (2013.01); *F02K 1/625* (2013.01); *F16H 21/44* (2013.01)

(58) Field of Classification Search
CPC . F02K 1/72; F02K 1/766; F02K 1/763; F02K 1/625; F02K 1/605; F02K 1/70
USPC ...................................................... 244/110 B
See application file for complete search history.

(56) References Cited

U.S. PATENT DOCUMENTS

| | | | | |
|---|---|---|---|---|
| 3,511,055 A | * | 5/1970 | Timms | F02K 1/72 60/229 |
| 3,608,314 A | | 9/1971 | Colley | |
| 3,831,376 A | * | 8/1974 | Moorehead | F02K 1/70 60/226.2 |
| 4,147,028 A | * | 4/1979 | Rodgers | F02K 1/72 239/265.29 |
| 4,216,926 A | * | 8/1980 | Lawson | F02K 1/72 239/265.27 |
| 5,097,662 A | * | 3/1992 | Vieth | F02K 1/70 239/265.29 |
| 5,228,641 A | * | 7/1993 | Remlaoui | F02K 1/72 239/265.31 |
| 5,309,711 A | * | 5/1994 | Matthias | F02K 1/72 239/265.29 |
| 6,036,238 A | * | 3/2000 | Lallament | B64D 29/06 292/100 |

(Continued)

FOREIGN PATENT DOCUMENTS

| | | | | |
|---|---|---|---|---|
| EP | 3018327 A1 | * | 5/2016 | ............... F02K 1/63 |
| EP | 3051112 A1 | * | 8/2016 | ............... F02K 1/72 |

(Continued)

OTHER PUBLICATIONS

EP search report for EP19184957.9 dated Feb. 20, 2020.

*Primary Examiner* — Christopher P Ellis
(74) *Attorney, Agent, or Firm* — Getz Balich LLC

(57) ABSTRACT

An assembly is provided for an aircraft propulsion system. This assembly includes a fixed structure, a translating structure, a blocker door and a folding linkage. The translating structure is configured to move between a stowed position and a deployed position. The blocker door is pivotally attached to the translating structure at a first pivot joint. The folding linkage links the blocker door to the fixed structure. The folding linkage includes a member pivotally attached to the blocker door at a second pivot joint that is radially outboard of a skin of the blocker door when the translating structure is in the stowed position. The second pivot joint is radially outboard of the first pivot joint when the translating structure is in the stowed position.

11 Claims, 8 Drawing Sheets

(56) References Cited

U.S. PATENT DOCUMENTS

| | | | | |
|---|---|---|---|---|
| 6,895,742 B2* | 5/2005 | Lair | .......................... | F02K 1/70 |
| | | | | 239/265.37 |
| 6,976,352 B2* | 12/2005 | Lair | .......................... | F02K 1/70 |
| | | | | 239/265.25 |
| 8,162,257 B2* | 4/2012 | Teulou | ................... | B64D 29/06 |
| | | | | 244/110 B |
| 9,127,623 B2 | 9/2015 | Peyron | | |
| 9,518,534 B2 | 12/2016 | Kusel | | |
| 9,739,235 B2 | 8/2017 | Gormley | | |
| 9,938,929 B2 | 4/2018 | Gormley | | |
| 2007/0007388 A1* | 1/2007 | Harrison | ................. | F02K 1/766 |
| | | | | 244/110 B |
| 2010/0270428 A1* | 10/2010 | Murphy | .................... | F02K 1/72 |
| | | | | 244/110 B |
| 2013/0264399 A1* | 10/2013 | Wingett | .................. | F02K 1/763 |
| | | | | 239/265.19 |
| 2014/0353399 A1 | 12/2014 | Stuart et al. | | |
| 2016/0245228 A1 | 8/2016 | Gormley | | |
| 2017/0198659 A1 | 7/2017 | Gormley | | |
| 2017/0292474 A1* | 10/2017 | Davies | .................... | F02K 1/625 |
| 2017/0298871 A1* | 10/2017 | Sawyers-Abbott | ..... | F02K 1/625 |
| 2018/0258881 A1* | 9/2018 | Schaefer | ................... | F02K 1/60 |
| 2020/0018258 A1* | 1/2020 | Aziz | ....................... | F02K 1/763 |

FOREIGN PATENT DOCUMENTS

| | | | | |
|---|---|---|---|---|
| GB | 130875 A | | 8/1919 | |
| GB | 892483 A | * | 3/1962 | ............. F02K 1/625 |

* cited by examiner

THRUST REVERSER WITH BLOCKER DOOR FOLDING LINKAGE

BACKGROUND

1. Technical Field

This disclosure relates generally to an aircraft propulsion system and, more particularly, to a thrust reverser for an aircraft propulsion system.

2. Background Information

An aircraft propulsion system such as a turbofan gas turbine engine may include a thrust reverser to aid in aircraft landing. A typical thrust reverser includes a plurality of blocker doors, which pivot inward into a bypass duct from stowed positions to deployed positions. The pivoting of the blocker doors may be facilitated with use of drag links. A typical drag link is connected to an inner fixed structure at one end, and connected to a respective blocker door at the other end. As a result, even when the thrust reverser is not being used, the drag links extend across the bypass duct and thereby increase bypass duct drag and reduce engine efficiency during typical engine operation; e.g., during cruise. There is a need in the art therefore for an improved thrust reverser with reduced drag.

SUMMARY OF THE DISCLOSURE

According to an aspect of the present disclosure, an assembly is provided for an aircraft propulsion system. This assembly includes a fixed structure, a translating structure, a blocker door and a folding linkage. The translating structure is configured to move between a stowed position and a deployed position. The blocker door is pivotally attached to the translating structure at a first pivot joint. The folding linkage links the blocker door to the fixed structure. The folding linkage includes a member pivotally attached to the blocker door at a second pivot joint that is radially outboard of a skin of the blocker door when the translating structure is in the stowed position. The second pivot joint is radially outboard of the first pivot joint when the translating structure is in the stowed position.

According to another aspect of the present disclosure, another assembly is provided for an aircraft propulsion system. This assembly includes a fixed structure, a translating structure, a blocker door and a folding linkage. The translating structure is configured to translate between a stowed position and a deployed position. The blocker door is pivotally attached to the translating structure. The folding linkage links the blocker door and the fixed structure. The folding linkage includes a roller that engages the translating structure when the translating structure moves from the stowed position to an intermediate position between the stowed position and the deployed position.

According to still another aspect of the present disclosure, a method is provided during which method an aircraft propulsion system is provided that includes a fixed structure, a translating structure, a blocker door and a folding linkage. The blocker door is pivotally attached to the translating structure. The folding linkage connects the blocker door to the fixed structure. The translating structure moves from a stowed position towards a deployed position. The blocker door moves relative to the translating structure. The folding linkage is configured to initiate the moving of the blocker door substantially simultaneously with initiation of the moving of the translating structure.

The roller may be configured to facilitate pivoting of the blocker door as the translating structure translates from the stowed position to the intermediate position.

The folding linkage may include a link arm and a crank arm. The link arm may link and be pivotally attached to the fixed structure and the crank arm. The crank arm may link the link arm and the blocker door. The crank arm may be pivotally attached to the blocker door at the second pivot joint.

The crank arm may be configured with a roller that engages the translating structure during movement of the translating structure from the stowed position to a partially deployed position that is between the stowed position and the deployed position.

The roller may disengage the translating structure when the crank arm engages a stop on the blocker door.

The folding linkage may be configured to initiate movement of the blocker door relative to the translating structure substantially simultaneously with initiation of movement of the translating structure from the stowed position towards the deployed position.

The folding linkage may be configured to pivot the blocker door radially inwards as soon as the translating structure begins to translate axially from the stowed position towards the deployed position.

The folding linkage may be configured as or otherwise include a bi-folding linkage.

The assembly may further include a fixed cascade structure.

The blocker door may be one of a plurality of blocker doors. The folding linkage may be one of a plurality of folding linkages. Each of the blocker doors may be associated with a single one of the folding linkages.

The blocker door may extend laterally between opposing blocker door sides. The folding linkage may be aligned laterally midway between the opposing blocker door sides.

The folding linkage may be nested within a channel in the blocker door and within a channel in the translating structure when the translating structure is in the stowed position.

The moving of the blocker door relative to the translating structure may include pivoting the blocker door radially inwards into a bypass flowpath of the aircraft propulsion system.

The blocker door may pivot radially inwards as soon as the translating structure begins to translate axially from the stowed position towards the deployed position.

The blocker door may be pivotally attached to the translating structure at a first pivot joint. The folding linkage may be pivotally attached to the blocker door at a second pivot joint. The second pivot joint may be located radially outboard of the first pivot joint when the translating structure is in a stowed position.

The engagement between the roller and the translating structure may initiate the movement of the blocker door substantially simultaneously with the initiation of the movement of the translating structure.

The foregoing features and the operation of the invention will become more apparent in light of the following description and the accompanying drawings.

DETAILED DESCRIPTION

Figure 1:
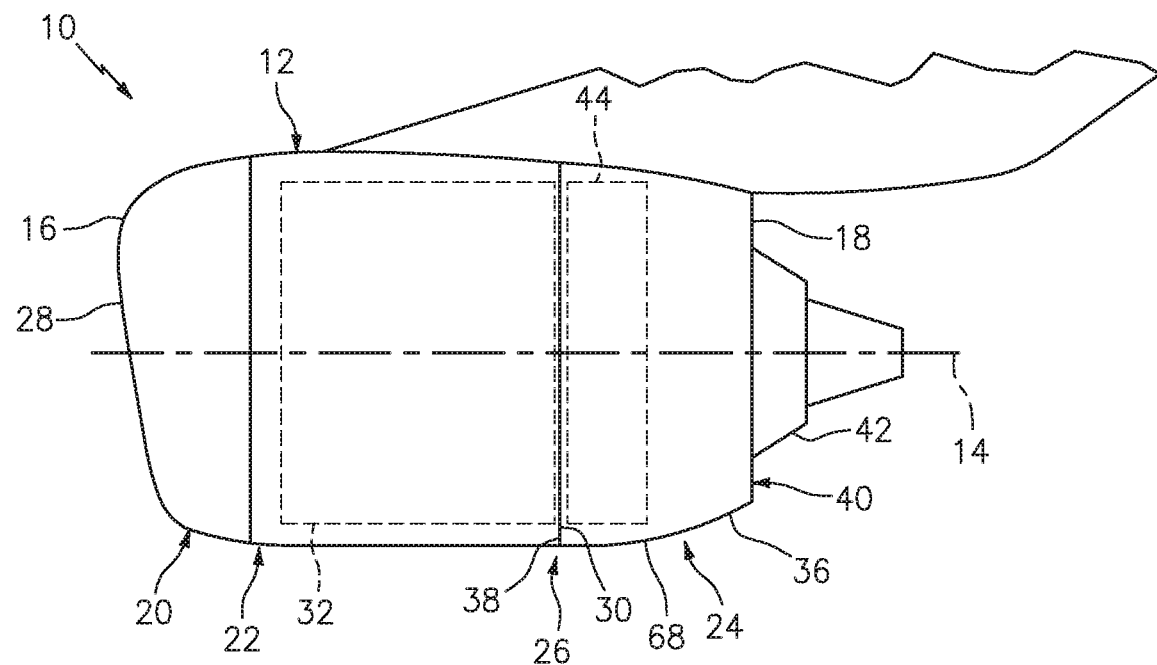
FIG. 1 is a schematic illustration of an aircraft propulsion system with a thrust reverser in a stowed position, in accordance with various embodiments.

FIG. 1 illustrates an aircraft propulsion system 10 for an aircraft such as, but not limited to, a commercial airliner or cargo plane. The propulsion system 10 includes a nacelle 12 and a gas turbine engine. This gas turbine engine may be configured as a high-bypass turbofan engine. Alternatively, the gas turbine engine may be configured as any other type of gas turbine engine capable of propelling the aircraft during flight.

The nacelle 12 is configured to house and provide an aerodynamic cover for the gas turbine engine. An outer structure of the nacelle 12 extends along an axial centerline 14 between a nacelle forward end 16 and a nacelle aft end 18. The nacelle 12 of FIG. 1 includes a nacelle inlet structure 20, one or more fan cowls 22 (one such cowl visible in FIG. 1) and a nacelle aft structure 24, which is configured as part of or includes a thrust reverser 26.

The inlet structure 20 is disposed at the nacelle forward end 16. The inlet structure 20 is configured to direct a stream of air through an inlet opening 28 at the nacelle forward end 16 and into a fan section of the gas turbine engine.

The fan cowls 22 are disposed axially between the inlet structure 20 and the aft structure 24. Each fan cowl 22 of FIG. 1, in particular, is disposed at (e.g., on, adjacent or proximate) an aft end 30 of a stationary portion of the nacelle 12, and extends forward to the inlet structure 20. Each fan cowl 22 is generally axially aligned with a fan section of the gas turbine engine. The fan cowls 22 are configured to provide an aerodynamic covering for a fan case 32. Briefly, this fan case 32 circumscribes the fan section and partially forms a forward outer peripheral boundary of a bypass flowpath 34 (see FIGS. 3 and 4) of the propulsion system 10.

The term "stationary portion" is used above to describe a portion of the nacelle 12 that is stationary during propulsion system 10 operation (e.g., during takeoff, aircraft flight and landing). However, the stationary portion may be otherwise movable for propulsion system 10 inspection/maintenance; e.g., when the propulsion system is non-operational. Each of the fan cowls 22, for example, may be configured to provide access to components of the gas turbine engine such as the fan case 32 and/or peripheral equipment configured therewith for inspection, maintenance and/or otherwise. In particular, each of fan cowls 22 may be pivotally mounted with the aircraft propulsion system 10 by, for example, a pivoting hinge system. Alternatively, the fan cowls 22 and the inlet structure 20 may be configured into a single axially translatable body for example. The present disclosure, of course, is not limited to the foregoing fan cowl configurations and/or access schemes.

The aft structure 24 includes a translating sleeve 36 for the thrust reverser 26. The translating sleeve 36 of FIG. 1 is disposed at the nacelle aft end 18. This translating sleeve 36 extends axially along the axial centerline 14 between a forward end 38 thereof and the nacelle aft end 18. The translating sleeve 36 is configured to partially form an aft outer peripheral boundary of the bypass flowpath 34. The translating sleeve 36 may also be configured to form a bypass nozzle 40 for the bypass flowpath 34 with an inner structure 42 of the nacelle 12 (e.g., an inner fixed structure (IFS)), which nacelle inner structure 42 houses a core of the gas turbine engine.

The translating sleeve 36 of FIG. 1 includes a pair of sleeve segments (e.g., halves) arranged on opposing sides of the propulsion system 10 (one such sleeve segment visible in FIG. 1). The present disclosure, however, is not limited to such an exemplary translating sleeve configuration. For example, the translating sleeve 36 may alternatively have a substantially tubular body. For example, the translating sleeve 36 may extend more than three-hundred and thirty degrees (330°) around the centerline 14.

Figure 2:
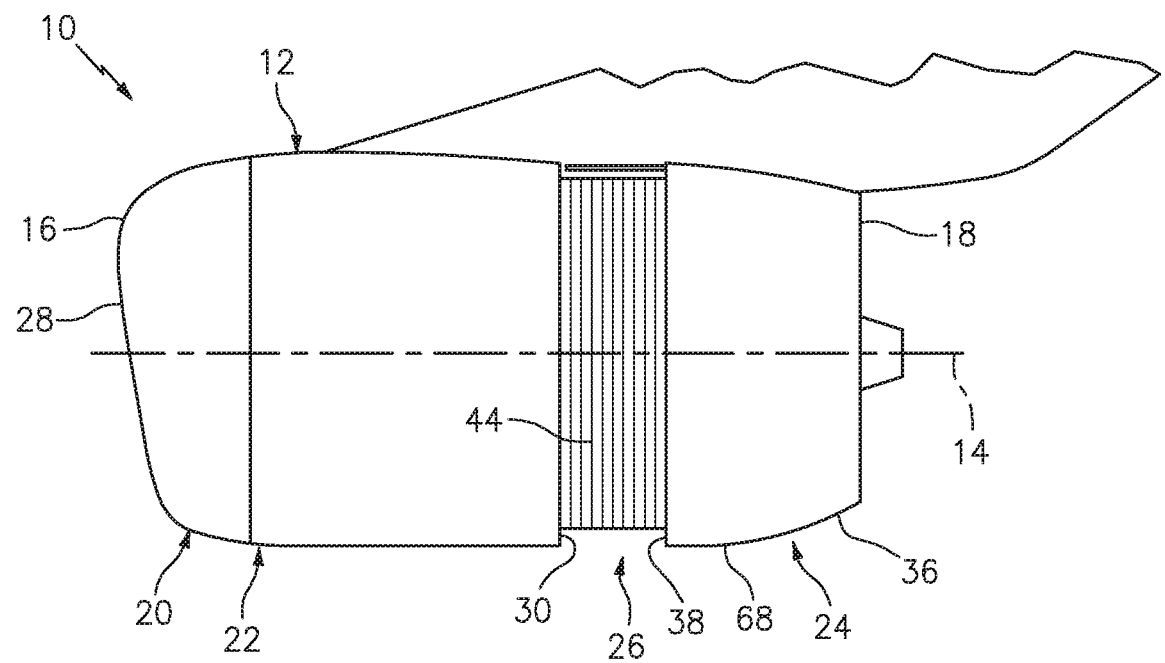
FIG. 2 is a schematic illustration of the aircraft propulsion system with the thrust reverser in a deployed position, in accordance with various embodiments.

Referring to FIGS. 1 and 2, the translating sleeve 36 is an axially translatable structure. Each translating sleeve segment, for example, may be slidably connected to one or more stationary structures (e.g., a pylon and a lower bifurcation) through one or more respective track assemblies. Each track assembly may include a rail mated with a track beam; however, the present disclosure is not limited to the foregoing exemplary sliding connection configuration.

With the foregoing configuration, the translating sleeve 36 may translate axially along the axial centerline 14 and relative to the stationary portion. The translating sleeve 36 may thereby move axially between a forward stowed position (see FIG. 1) and an aft deployed position (see FIG. 2). In the forward stowed position, the translating sleeve 36 provides the functionality described above. In the aft deployed position, the translating sleeve 36 at least partially (or substantially completely) uncovers at least one or more other components of the thrust reverser 26 such as, but not limited to, a fixed cascade structure 44. In addition, as the translating sleeve 36 moves from the stowed position to the deployed position, one or more blocker doors 46 (one visible in FIGS. 3 and 4) arranged with the translating sleeve 36 may be deployed to divert bypass air from the bypass flowpath 34 and through the cascade structure 44 to provide reverse thrust.

Figure 3:
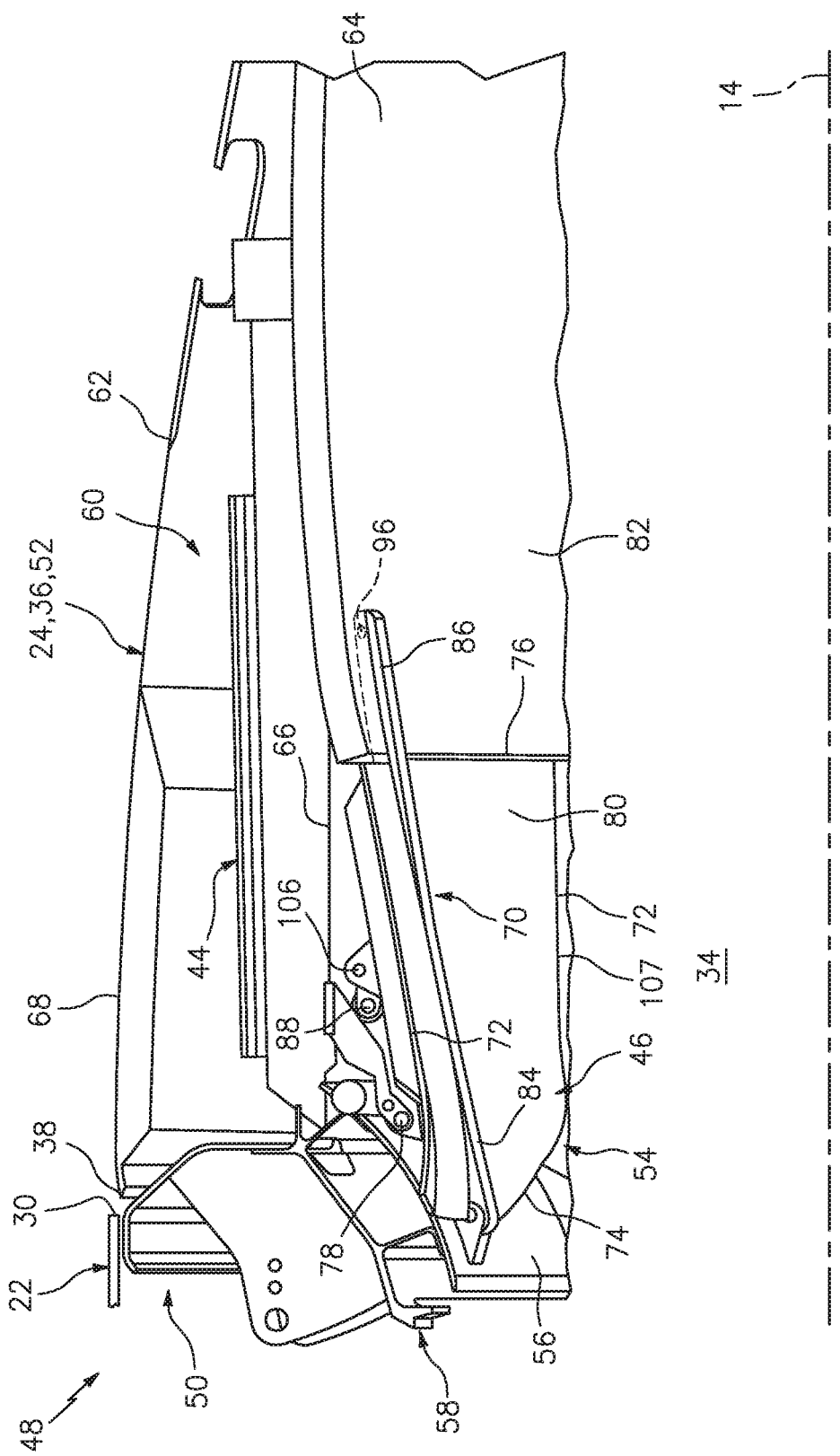
FIG. 3 is a side-sectional illustration of an aft portion of the aircraft propulsion system in FIG. 1, in accordance with various embodiments.
Figure 4:
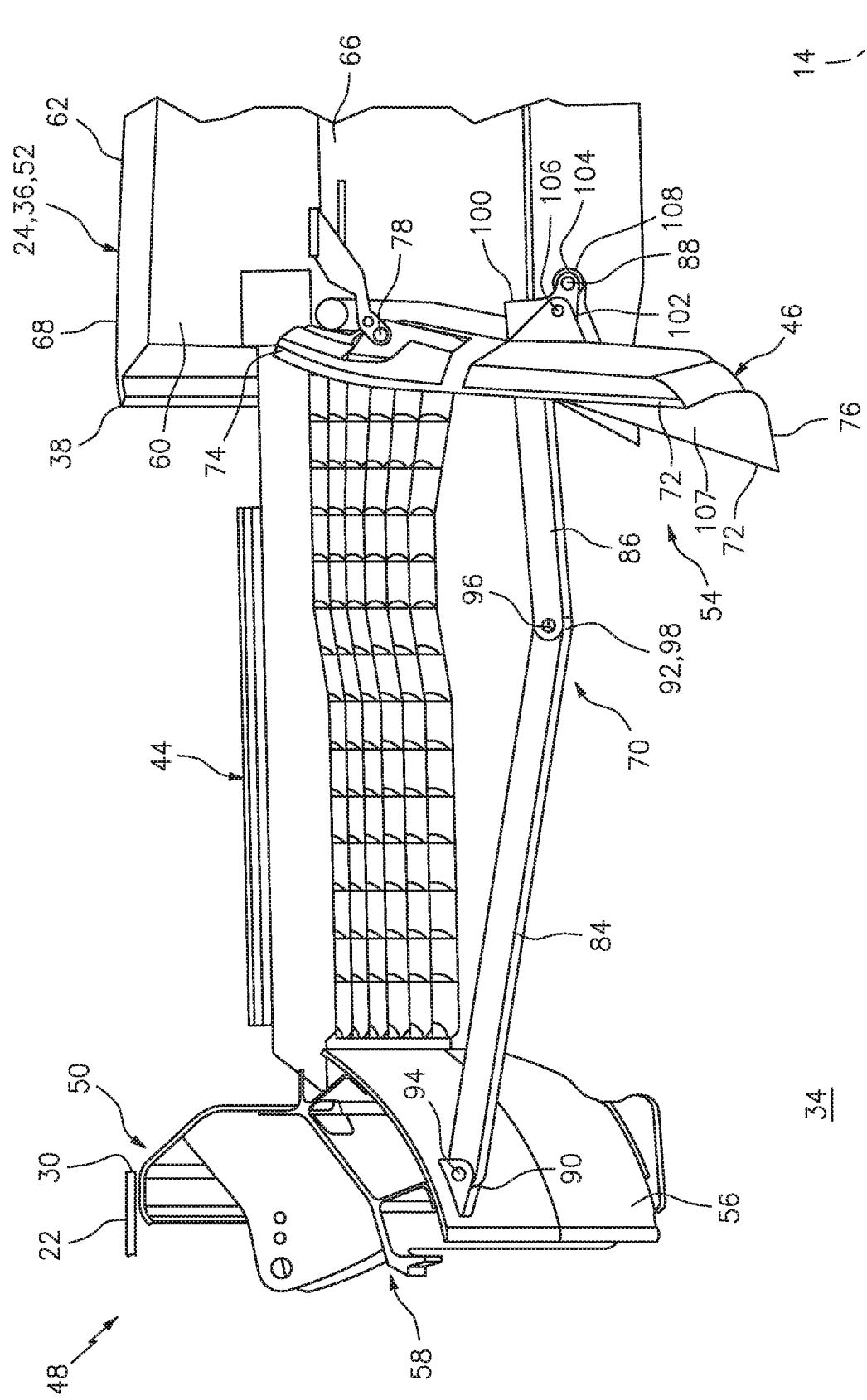
FIG. 4 is a side-sectional illustration of an aft portion of the aircraft propulsion system in FIG. 2, in accordance with various embodiments.

FIG. 3 is a partial side sectional illustration of an assembly 48 for the propulsion system 10 with the thrust reverser 26 in a stowed position. FIG. 4 is a partial side sectional illustration of the assembly 48 with the thrust reverser 26 in a deployed position. This assembly 48 of FIGS. 3 and 4 includes a nacelle fixed structure 50, a nacelle translating structure 52 and a thrust reverser blocker door assembly 54.

The fixed structure 50 is located at the aft end 30 of the stationary portion of the nacelle 12. The fixed structure 50 of FIGS. 3 and 4 includes a bullnose 56 and an internal nacelle support structure 58. The bullnose 56 is configured to provide a smooth aerodynamic transition from a bypass flowpath 34 of the aircraft propulsion system 10 to a thrust reverser duct, which extends axially between the support structure 58 and the translating structure 52 (see FIG. 4). The support structure 58 circumscribes and supports the bullnose 56. The support structure 58 also provides a base to which the cascade structure 44 may be mounted. The cascade structure 44 may thereby project axially aft from the support structure 58. With such a configuration, when the translating structure 52 is in the stowed position of FIG. 3, the cascade structure 44 is located within an internal cavity 60 of the translating structure 52. When the translating structure 52 is in the deployed position of FIG. 4, the cascade structure 44 is uncovered and located within the thrust reverser duct.

The translating structure 52 is configured as or otherwise includes the translating sleeve 36. The translating sleeve 36 of FIGS. 3 and 4 includes an outer panel 62, and inner panel 64 and an internal support structure 66. The outer panel 62 is configured to form a portion of an outer aerodynamic surface 68 of the nacelle 12 adjacent the bypass nozzle 40 (see FIG. 1). The inner panel 64 is configured to form a portion of an outer peripheral boundary of the bypass flowpath 34 adjacent the bypass nozzle 40. The internal support structure 66 is positioned radially between the outer panel 62 and the inner panel 64. The internal support structure 66 is disposed with the internal cavity 60, which is radially between the outer panel 62 and the inner panel 64. The internal cavity 60 extends axially aft into the translating sleeve 36 from its forward end 38.

The door assembly 54 of FIG. 4 includes the one or more blocker doors 46 (one visible in FIG. 4), which are arranged circumferentially about the centerline 14. The door assembly 54 also includes at least one folding linkage 70 associated with each blocker door 46.

Each blocker door 46 extends laterally (e.g., circumferentially and/or tangentially) between opposing blocker door sides 72. Each blocker door 46 extends longitudinally between a first blocker door end 74 and a second blocker door end 76. The blocker door 46 is pivotally attached to the translating structure 52 and, more particularly, the internal support structure 66 of the translating sleeve 36 at one or more pivot joints 78; e.g., via hinges. These pivot joints 78 are respectively located at the opposing blocker door sides 72. The pivot joints 78 are also located generally at the first blocker door end 74. With this configuration, each blocker door 46 is configured to move (e.g., pivot) radially inwards from the stowed position of FIG. 3 to the deployed position of FIG. 4. In the stowed position of FIG. 3, the blocker door 46 may be mated with, nested in a respective pocket in the translating structure 52. A surface 80 of the blocker door 46 may thereby be positioned approximately flush with an inner surface 82 of the inner panel 64. In the deployed position of FIG. 4, the blocker door 46 projects radially downward from the translating structure 52 into the bypass flowpath 34.

The folding linkage 70 may be configured as a bi-folding linkage. The folding linkage 70 of FIG. 4, for example, includes a rigid, unitary link arm 84 and a rigid, unitary crank arm 86. The folding linkage 70 also includes a roller 88, or other carriage device, configured with the crank arm 86. Alternatively, the roller 88 may be replaced with a fixed blunt edge end. For example, the crank arm 86 may terminate with the blunt edge end, where a curved surface of this end essentially mimics a curved surface of the roller 88. In such embodiments, a wear surface may be added to a portion of the sleeve 36 that engages the blunt edge end. Still alternatively, the roller 88 may be replaced with a track and guide assembly, or any other suitable assembly.

Referring still to FIG. 4, the link arm 84 extends between a first (e.g., forward) link arm end 90 and a second (e.g., aft) link arm end 92. The link arm 84 is pivotally attached to the fixed structure 50 via a first pivot joint 94 (e.g., a hinged, clevis connection), which joint 94 is located at the first link arm end 90 and on, for example, the bullnose 56. The link arm 84 is pivotally attached to the crank arm 86 via a second pivot joint 96 (e.g., a hinged, clevis connection), which joint 96 is located at the second link arm end 92 and a first crank arm end 98 of the crank arm 86. The link arm 84 thereby mechanically connects (e.g., links) the fixed structure 50 with the crank arm 86.

The crank arm 86 extends along a first trajectory from its first crank arm end 98 to a first elbow 100. The crank arm 86 then extends along a second trajectory from the first elbow 100 to a second elbow 102, which second trajectory may be approximately (e.g., +/−5-10 degrees) perpendicular to the first trajectory. The crank arm 86 then extends along a third trajectory from the second elbow 102 to a second crank arm end 104, which third trajectory may be approximately (e.g., +/−5-10 degrees) perpendicular to the second trajectory and approximately (e.g., +/−5-10 degrees) parallel, but not coaxial, with the first trajectory. The crank arm 86 is pivotally attached to a respective blocker door 46 via a third pivot joint 106 (e.g., a hinged, clevis connection), which joint 106 is located at the second elbow 102 and radially outboard (e.g., radially outside) of a skin 107 of the blocker door 46 when the translating structure 52 is stowed as shown, for example, in FIG. 3. The roller 88 is rotatably connected to the crank arm 86 via a roller joint 108, which joint is located at the second crank arm end 104. The roller joint 108 is located (e.g., approximately midway) between the first blocker door end 74 and the second blocker door end 76 and forward of the pivot joints 96 and 106 when the thrust reverser is in the stowed position. The roller joint 108 and, thus, the folding linkage 70 may be aligned laterally (e.g., midway) between the opposing blocker door sides 72.

Figure 5A:
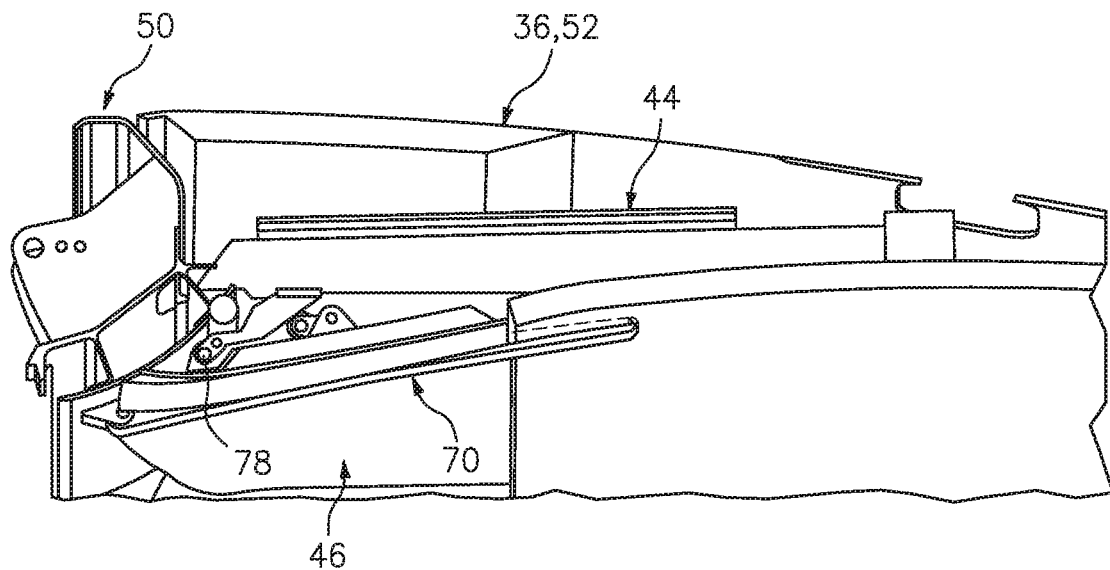
FIGS. 5A-5H illustrate a sequence of the thrust reverser moving from a stowed position to a deployed position, in accordance with various embodiments.
Figure 5B:
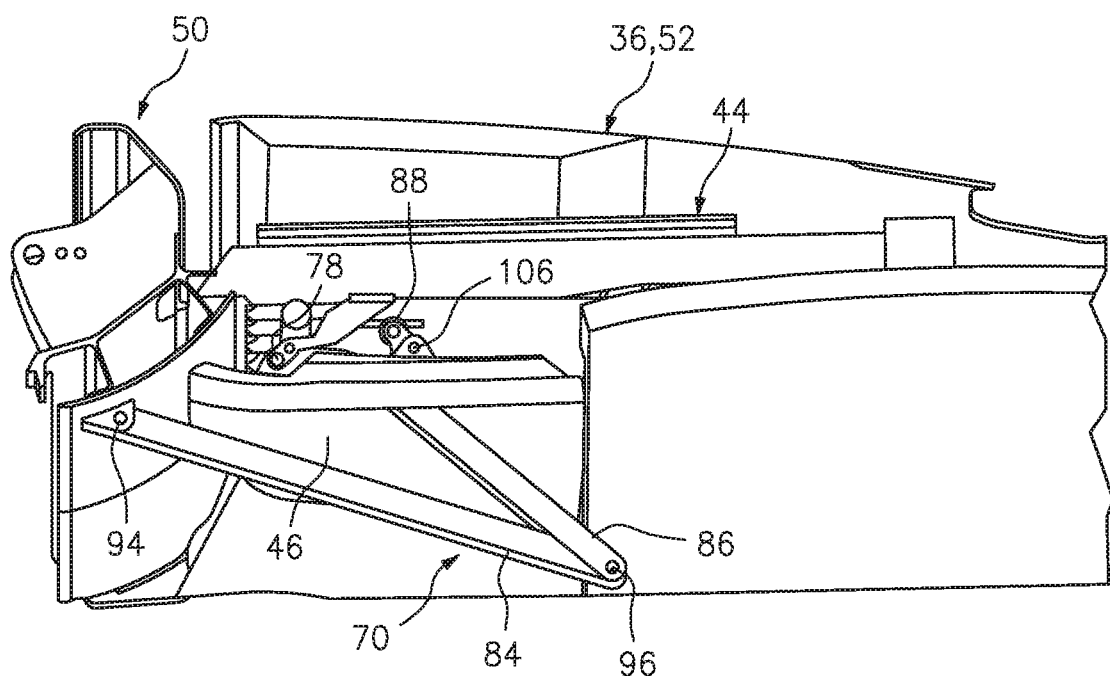
Figure 5C:
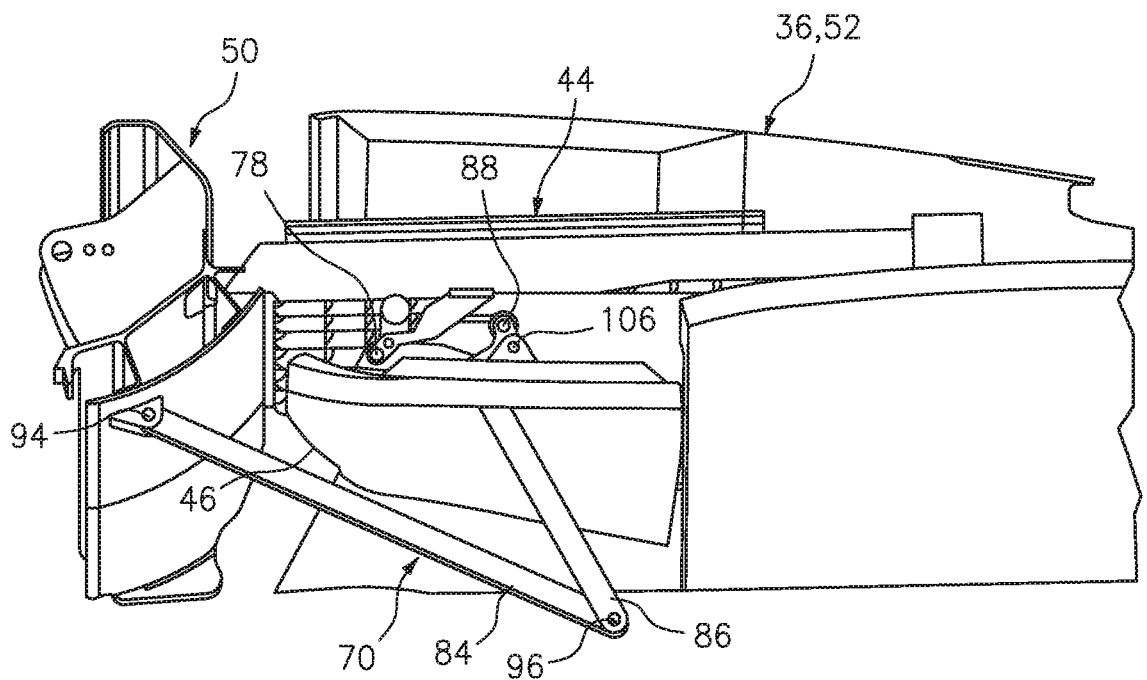
Figure 5D:
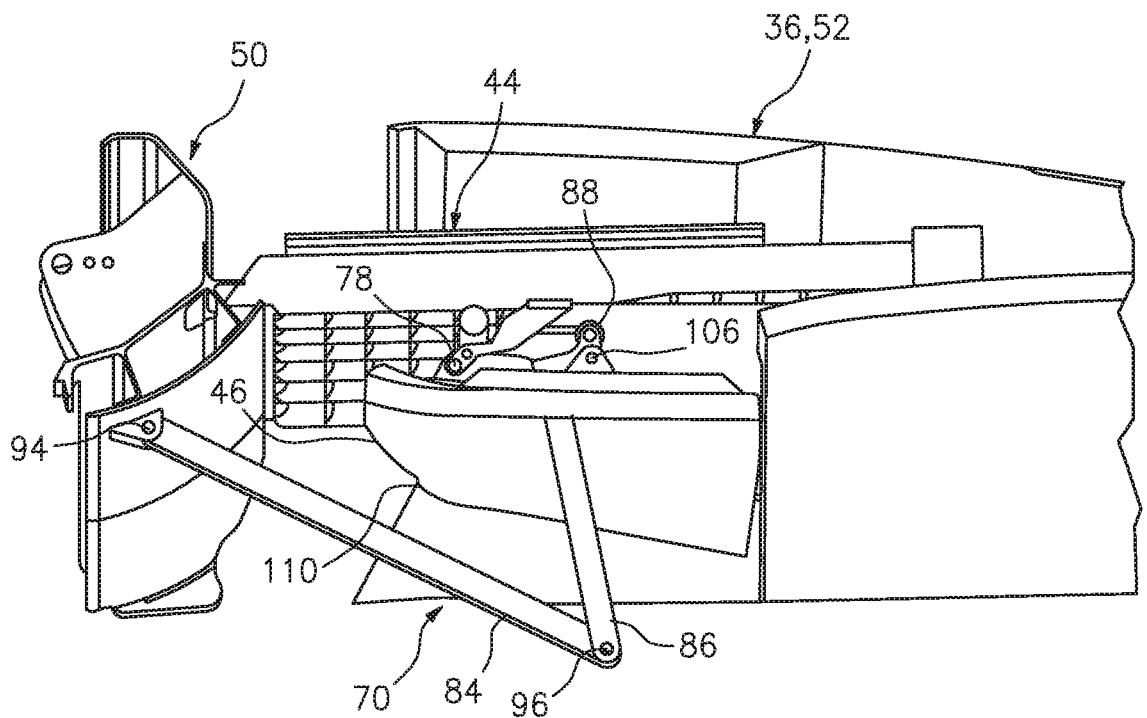
Figure 5E:
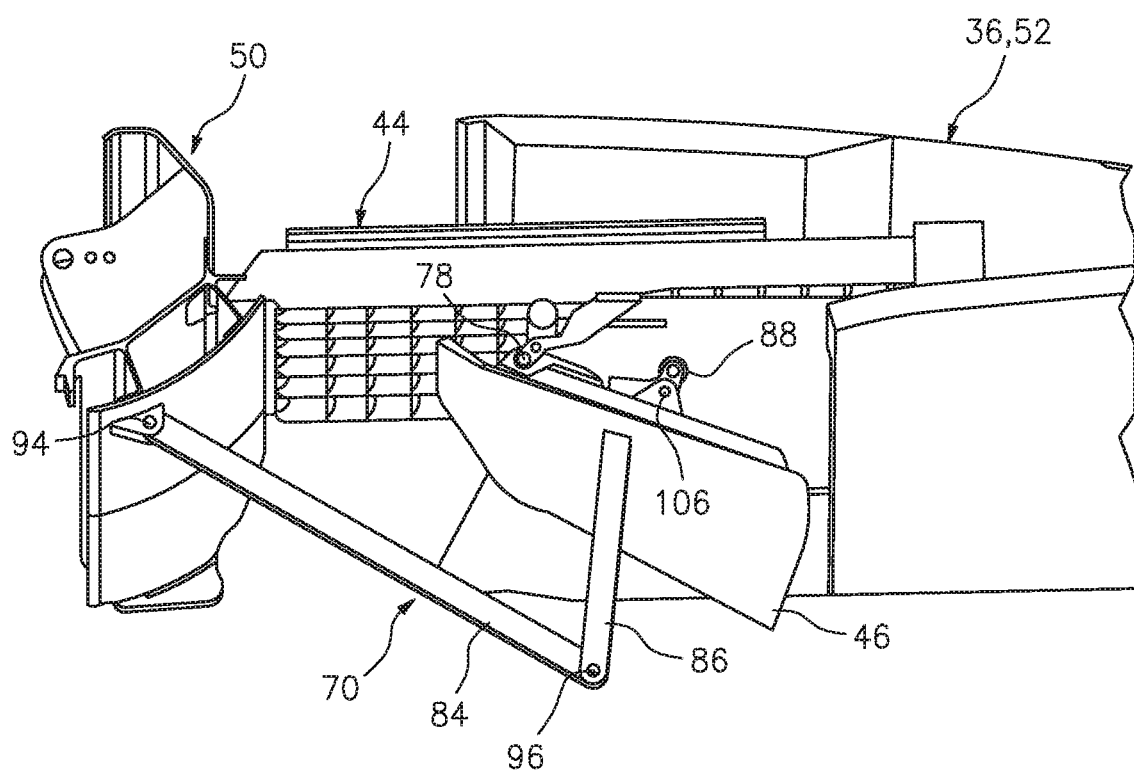
Figure 5F:
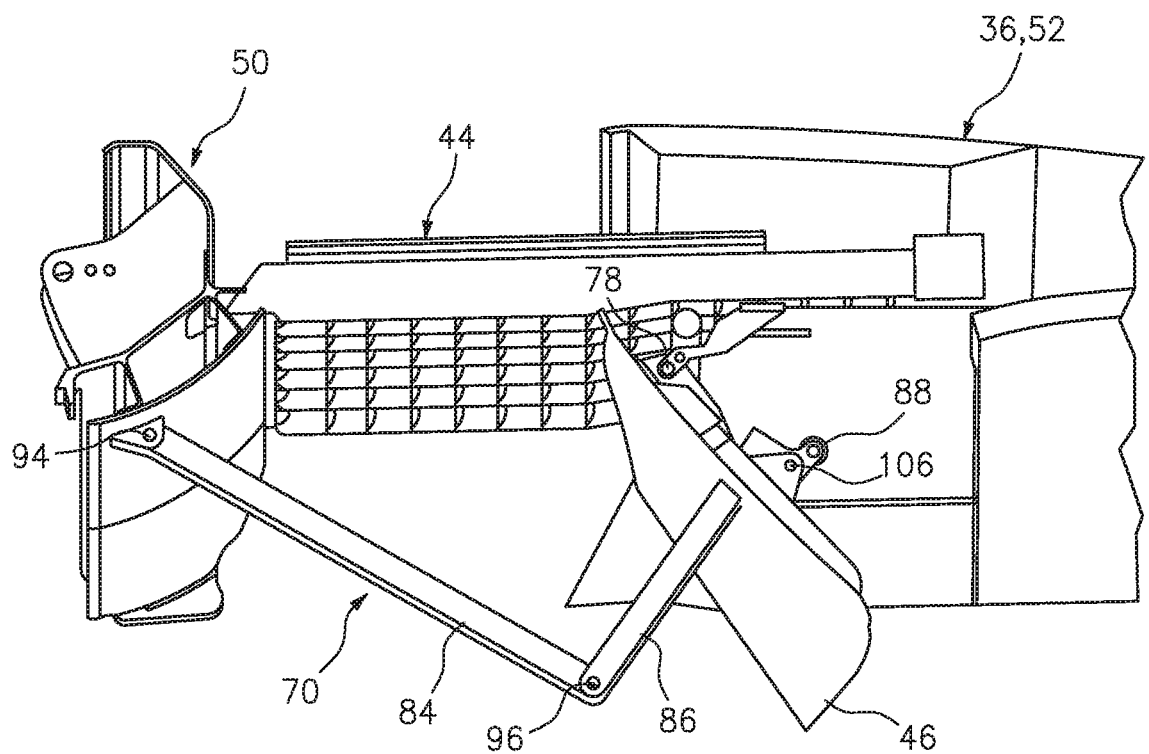
Figure 5G:
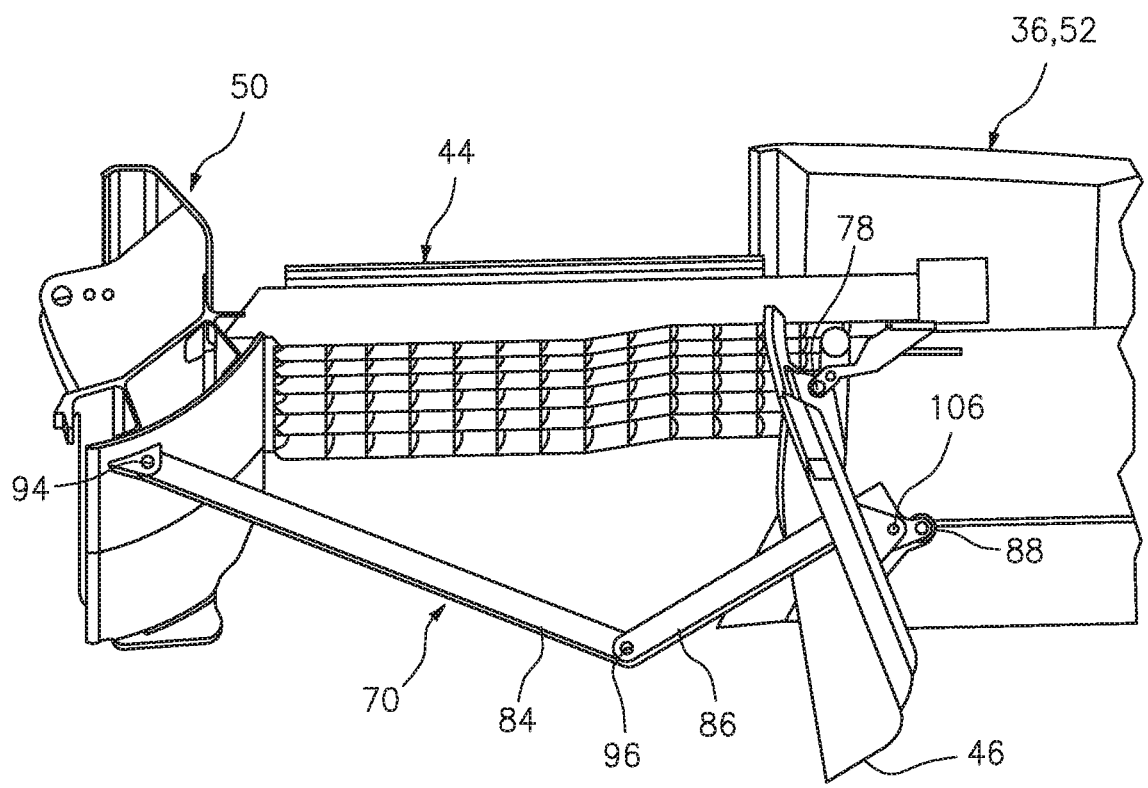
Figure 5H:
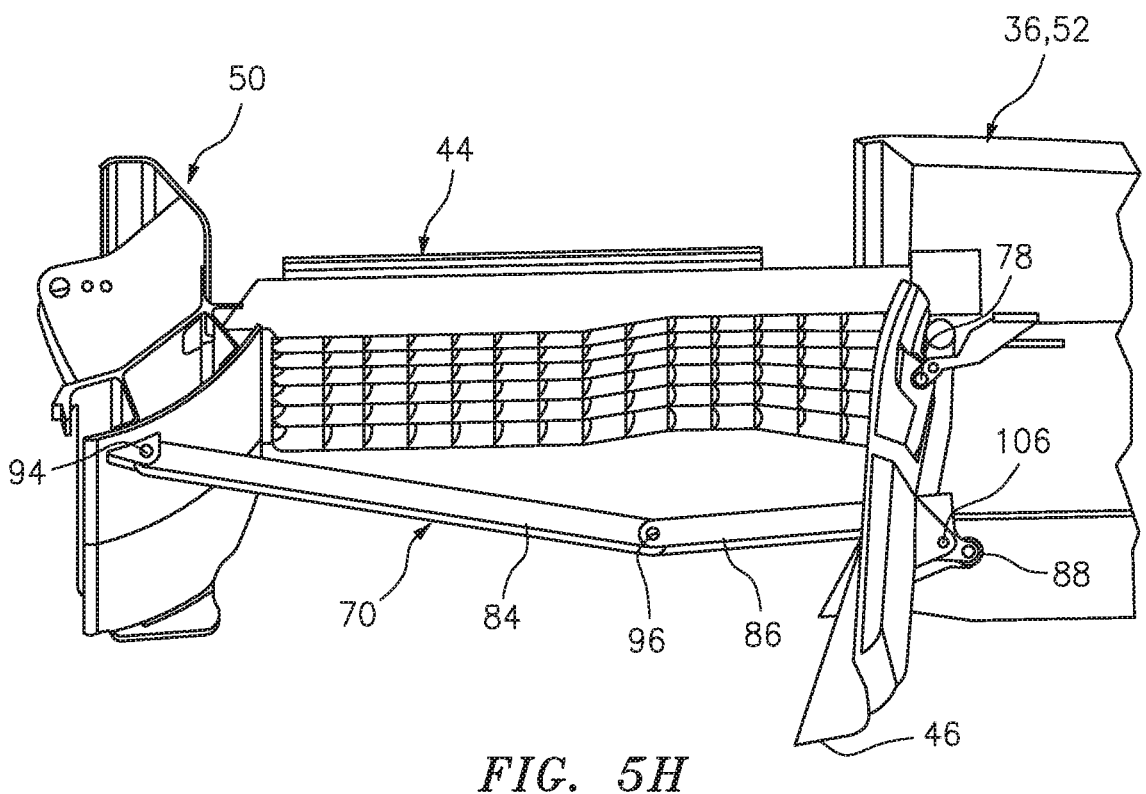

FIGS. 5A-5H illustrate a sequence of the thrust reverser 26 deploying, where the translating structure 52 is in the stowed position in FIG. 5A and the translating structure 52 is in the deployed position in FIG. 5H. In the stowed position of FIG. 5A, each blocker door 46 is nested within a respective pocket in the translating structure 52. In addition, each folding linkage 70 is folded and nested in a channel in the respective blocker door 46 and a respective channel in the translating structure 52. With this configuration, the folding linkage 70 is tucked away and out of the bypass flowpath 34 then the thrust reverser 26 is not being used. By contrast, a drag link of a typical prior art thrust reverser extends across a bypass duct even when the thrust reverser is not being used, which increases drag and, thus, reduces engine efficiency during nominal operation.

During deployment, movement of each blocker door 46 is actuated by axial movement of the translating structure 52. In particular, as the translating structure 52 moves axially aft from its stowed position towards the deployed position, the translating structure 52 pulls the blocker doors 46 aft. To compensate for the increased axial distance between the blocker doors 46 and the fixed structure 50, each folding linkage 70 begins to unfold. More particularly, the second link arm end 92 pivots about the first pivot joint 94 and moves radially inward. The first crank arm end 98 correspondingly pivots about the third pivot joint 106 and moves radially inward. This pivoting of the crank arm 86, in turn, causes the second crank arm end 104 to also pivot about the third pivot joint 106. As a result, the roller 88 is pushes radially against the internal support structure 66 of the translating structure 52, which causes the third pivot joint 106 and, thus, the blocker door 46 to move radially inward and away from the internal support structure 66. More particularly, the engagement of the roller 88 against the internal support structure 66 causes the second blocker door end 76 to pivot about the pivot joints 78 and move radially inward. With this configuration, the folding linkage 70 is configured to initiate movement (e.g., pivoting) of the respective blocker door 46 substantially simultaneously (e.g., +/−time associated with standard industry engineering tolerances) with the initiation of the aft translation of the translating structure 52 from the stowed position towards the deployed position. In other words, the elements 46 and 52 are configured to begin moving at the same time.

The roller 88 continues to cause the respective blocker door 46 to pivot inward until the crank arm 86 reaches and engages a stop 110 configured into the blocker door 46 associated with an intermediate translating structure 52 position; e.g., see FIG. 5D. Once the crank arm 86 reaches and engages this stop 110, the crank arm 86 no longer moves relative to the blocker door 46 as shown in FIGS. 5E-H. Rather, the crank arm 86 functions as a fixed member of the blocker door 46. The crank arm 86 thereby pivots the blocker door 46 radially inwards into the bypass flowpath 34 without moving relative to the blocker door 46.

It is worth noting, referring to FIG. 3, the pivot joints 78 may be located radially inward of the pivot joint 106 when the thrust reverser 26 and its elements are stowed. This configuration can be implemented because the crank arm 86 and the associated roller 88 push the folding linkage 70 radially inward as described above and, thereby, prevent the folding linkage 70 from binding.

In some embodiments, the internal support structure 66 may be configured with a wear plate to engage with the roller 88.

Figure 6:
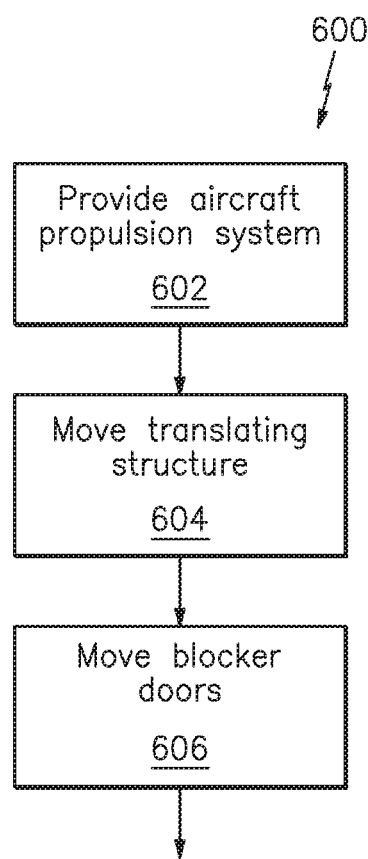
FIG. 6 is a flow diagram of a method for operating the assembly of FIG. 3, in accordance with various embodiments.

FIG. 6 is a flow diagram of a method 600 for operating the assembly 48 of FIG. 3. In step 602, the aircraft propulsion system 10 and its assembly 48 are provided. In step 604, the translating structure 52 is moved (e.g., translated axially) from its stowed position of FIG. 5A towards (or to) its deployed position of FIG. 5H using one or more actuators; e.g., linear actuators. In step 606, each blocker door 46 is moved relative to the translating structure 52. Herein, the term "relative" describes movement between the blocker door 46 and the translating structure 52. For example, while both the blocker door 46 and the translating structure move with each other axially in the sequence of FIGS. 5A-5H, the blocker door also pivots radially inwards away from the translating structure 52 and into the bypass flowpath 34. Of course, in other embodiments, the elements 46 and 52 may also or alternatively travel at different axial speeds and, thus, move axially relative to one another. As illustrated by the sequence of FIGS. 5A-5H, the movement (e.g., pivoting) of the blocker doors 46 is initiated substantially simultaneously (e.g., instantaneously) with initiation of the movement of the step 604. Thus, as soon as the translating structure 52 begins to move axially from the stowed position to the deployed position, each blocker door 46 begins to pivot radially inward and deploy.

The terms "radially", "axially", "upstream", "downstream", "inner" and "outer" and variants thereof are used herein to orientate the components of the aircraft propulsion system 10 described above relative to the turbine engine, the nacelle 12 and/or its axial centerline 14. For example, the term "radially inward" and variants thereof may describe movement of a component in a radial direction towards the centerline 14, or a position radially towards the centerline 14. By contrast, the term "radially outward" and variants thereof may describe movement of a component in a radial direction away the centerline 14, or a position radially away the centerline 14.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
a fixed structure;
a translating structure configured to move between a stowed position and a deployed position;
a blocker door pivotally attached to the translating structure at a first pivot joint; and
a folding linkage linking the blocker door to the fixed structure, the folding linkage comprising a member pivotally attached to the blocker door at a second pivot joint that is radially outboard of a skin of the blocker door when the translating structure is in the stowed position;
wherein the second pivot joint is radially outboard of the first pivot joint when the translating structure is in the stowed position.

2. The assembly of claim 1, wherein
the folding linkage comprises a link arm and a crank arm;
the link arm links and is pivotally attached to the fixed structure and the crank arm; and
the crank arm links the link arm and the blocker door, and is pivotally attached to the blocker door at the second pivot joint.

3. The assembly of claim 2, wherein the crank arm is configured with a roller that engages the translating structure during movement of the translating structure from the stowed position to a partially deployed position that is between the stowed position and the deployed position.

4. The assembly of claim 3, wherein the roller disengages the translating structure when the crank arm engages a stop on the blocker door.

5. The assembly of claim 1, wherein the folding linkage is configured to initiate movement of the blocker door relative to the translating structure substantially simultaneously with initiation of movement of the translating structure from the stowed position towards the deployed position.

6. The assembly of claim 1, wherein the folding linkage is configured to pivot the blocker door radially inwards as soon as the translating structure begins to translate axially from the stowed position towards the deployed position.

7. The assembly of claim 1, wherein the folding linkage comprises a bi-folding linkage.

8. The assembly of claim 1, further comprising a fixed cascade structure.

9. The assembly of claim 1, wherein
the blocker door is one of a plurality of blocker doors;
the folding linkage is one of a plurality of folding linkages; and
each of the blocker doors is associated with a single one of the folding linkages.

10. The assembly of claim 1, wherein
the blocker door extends laterally between opposing blocker door sides; and
the folding linkage is aligned laterally midway between the opposing blocker door sides.

11. The assembly of claim 1, wherein the folding linkage is nested within a channel in the blocker door and within a channel in the translating structure when the translating structure is in the stowed position.

\* \* \* \* \*